United States Patent
Tazawa et al.

(10) Patent No.: US 8,378,615 B2
(45) Date of Patent: Feb. 19, 2013

(54) MOTOR CONTROLLER

(75) Inventors: Toru Tazawa, Osaka (JP); Hiroshi Fujiwara, Osaka (JP); Masaru Nishizono, Osaka (JP)

(73) Assignee: Panasonic Corporation, Osaka (JP)

( * ) Notice: Subject to any disclaimer, the term of this patent is extended or adjusted under 35 U.S.C. 154(b) by 135 days.

(21) Appl. No.: 12/678,802

(22) PCT Filed: Jun. 1, 2009

(86) PCT No.: PCT/JP2009/002411
§ 371 (c)(1),
(2), (4) Date: Mar. 18, 2010

(87) PCT Pub. No.: WO2009/147813
PCT Pub. Date: Dec. 10, 2009

(65) Prior Publication Data
US 2011/0221378 A1    Sep. 15, 2011

(30) Foreign Application Priority Data
Jun. 4, 2008   (JP) .................................. 2008-146404

(51) Int. Cl.
G05B 5/01    (2006.01)
(52) U.S. Cl. .......................... 318/619; 318/560; 318/611
(58) Field of Classification Search .................. 318/560, 318/611, 619
See application file for complete search history.

(56) References Cited

U.S. PATENT DOCUMENTS

| 6,903,806 B2 * | 6/2005 | Morisada .................... 355/72 |
| 8,222,853 B2 * | 7/2012 | Kishimoto et al. ........... 318/638 |
| 2003/0147062 A1 | 8/2003 | Morisada |

FOREIGN PATENT DOCUMENTS

| EP | 0899864 A1 | 3/1999 |
| JP | 2003-052188 A | 2/2003 |
| JP | 2003052188 A | 2/2003 |
| JP | 2003-228422 A | 8/2003 |
| JP | 2004-274976 A | 9/2004 |
| JP | 2006-288124 A | 10/2006 |

OTHER PUBLICATIONS

International Search Report for PCT/JP2009/002411, Aug. 18, 2009.
German Office Action for German Application Serial No. 112009000017.7, Nov. 21, 2011, Panasonic Corporation.

* cited by examiner

*Primary Examiner* — Kawing Chan
(74) *Attorney, Agent, or Firm* — RatnerPrestia

(57) ABSTRACT

There are provided: a plurality of notch filters which are arranged inside a control system for feedback-controlling a moving operation of a moving section of a motor and attenuate signal components having near frequencies with a notch frequency at a center in an input signal; a plurality of oscillation extracting filters which are set with different frequency bands as being corresponded to the respective notch filters and extract oscillating components in the set frequency bands from a speed detection signal; and a plurality of notch controlling sections which are arranged with respect to the respective oscillation extracting filters and control the notch frequencies of the corresponding notch filters so as to decrease amplitudes of the oscillating components extracted by the oscillation extracting filters.

14 Claims, 9 Drawing Sheets

MOTOR CONTROLLER

This application is a U.S. National Phase Application of PCT International Application PCT/JP2009/002411.

TECHNICAL FIELD

The present invention relates to a motor controller for controlling a moving operation, such as a speed and a position, of a motor or a load driven by the motor, and particularly relates to a motor controller for suppressing mechanical resonance that occurs in a case of driving the load.

BACKGROUND ART

Such a motor controller for suppressing mechanical resonance has hitherto been disclosed, for example, in Patent Document 1.

In the following, a conventional motor controller is described with reference to FIG. 9. FIG. 9 is a block diagram of a conventional motor controller.

This conventional motor controller 90 is connected to motor 11 and speed detector 13. Motor 11 is connected with load 12. Further, speed detector 13 measures a speed of motor 11, and outputs speed detection signal Va indicating the speed of motor 11 based upon a result of the measurement.

Further, as shown in FIG. 9, motor controller 90 is provided with a plurality of serially connected notch filters 95a, 95b and 95c for a purpose of suppressing an oscillation caused by mechanical resonance. Moreover, motor controller 90 is provided with speed controlling section 94, frequency estimating section 97, notch filter selecting section 98, notch frequency setting section 99, and torque controlling section 96.

Frequency estimating section 97 estimates an oscillation frequency when an oscillation caused by mechanical resonance occurs. Notch filter selecting section 98 selects one notch filter out of notch filters 95a, 95b and 95c based upon a frequency estimated by frequency estimating section 97, and an enable or disable set state and a set notch frequency of each notch filter. Notch frequency setting section 99 sets the notch frequency of the one notch filter selected by notch filter selecting section 98 to the frequency estimated by frequency estimating section 97.

Further, speed controlling section 94 receives inputs of speed command signal Vt and speed detection signal Va, to generate torque command signal T1. Torque command signal T1 is supplied to notch filter 95a, and torque command signal T2 as a signal subjected to a filter process by notch filters 95a, 95b and 95c is supplied to torque controlling section 96. Torque controlling section 96 controls motor 11 based upon torque command signal T2 such that motor 11 outputs a target torque.

In conventional motor controller 90 configured in this manner, when an oscillation caused by mechanical resonance occurs, one appropriate notch filter is selected out of the plurality of notch filters based upon an estimated oscillation frequency, and an enable or disable set state and a notch frequency of each notch filter, and the notch frequency is reset. Since conventional motor controller 90 is provided with the plurality of notch filters, even when a plurality of mechanical resonances occur, the controller can respectively suppress oscillations caused by the respective mechanical resonance appropriately.

However, the conventional motor controller as described above has been configured to select one appropriate notch filter out of a plurality of notch filters based upon an oscillation frequency estimated in one frequency estimating section. For this reason, in a case of mechanical resonance being such an oscillation as to contain a plurality of frequency components, correct oscillation frequencies cannot be estimated, or a suppressing operation is performed only on one frequency out of those frequency components, or the suppressing operation is time-sequentially performed on each frequency component. In other words, there have been problems such as a problem of non-setting of an appropriate notch filter against mechanical resonance containing a plurality of frequency components, thus preventing exertion of an oscillation suppressing effect, and a problem of needing of time for suppressing an oscillation. Further, as means for estimating a frequency, a method through use of a zero-cross cycle, a method based upon a frequency analysis such as FFT, and the like, may also be considered. However, there have been problems such as a problem with the former method in that a stable cycle cannot be obtained in the case of mechanical resonance containing a plurality of frequency components, and a problem with the latter method in that a frequency cannot be accurately estimated unless the number of data to some extent is obtained, and thereby requires time.

RELATED ART DOCUMENT

Patent Document

[Patent Document 1] Unexamined Japanese Patent Publication No. 2006-288124

DISCLOSURE OF THE INVENTION

A motor controller of the present invention having a control system for feedback-controlling a moving operation of a motor moving section through use of a detected moving amount of the moving section, the motor controller including: a plurality of notch filters which are arranged inside the control system and attenuate signal components having near frequencies with a notch frequency at a center in an input signal; a plurality of oscillation extracting filters which are set with different frequency bands as being corresponded to the respective notch filters and extract oscillating components from the moving amount based upon the set frequency bands; and a plurality of notch controlling sections which are arranged with respect to the respective oscillation extracting filters and control the notch frequencies of the corresponding notch filters so as to decrease amplitudes of the oscillating components extracted by the oscillation extracting filters.

With such a configuration, even when mechanical resonance, which occurs in a case of driving a load, contains a plurality of frequency components, the respective frequency components in the plurality of frequency components are individually and parallelly extracted by the plurality of oscillation extracting filters. Further, the notch controlling sections and the notch filters are operated in parallel while corresponding to the individual frequency components, and therefore even an oscillation of mechanical resonance containing a plurality of frequency components, and the like can be accurately and immediately suppressed.

PREFERRED EMBODIMENTS FOR CARRYING OUT OF THE INVENTION

In the following, embodiments of the present invention are described with reference to drawings.

Embodiment 1

Figure 1:
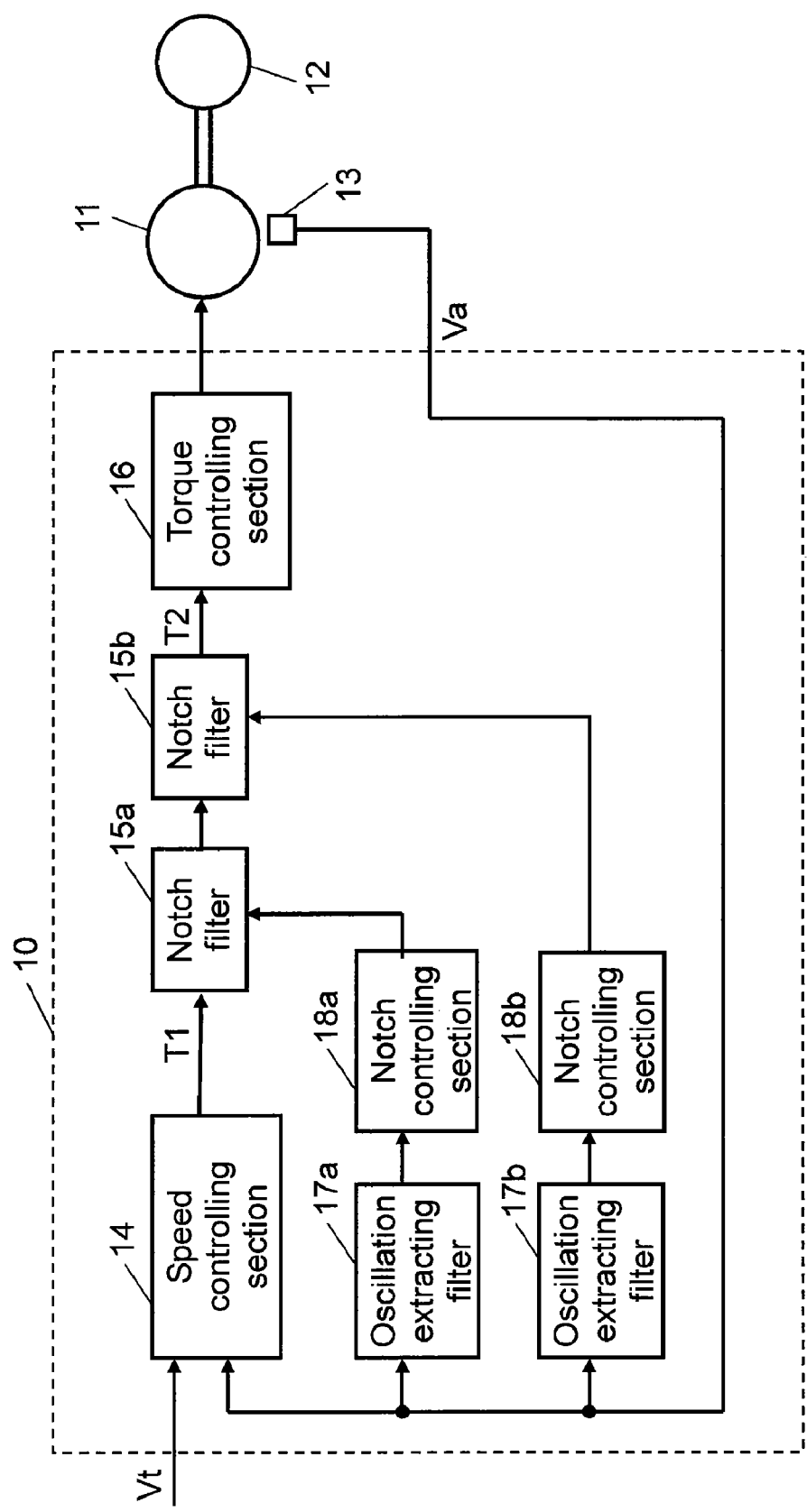
FIG. 1 is a block diagram of a motor controller in Embodiment 1 of the present invention.

FIG. 1 is a block diagram of motor controller 10 in Embodiment 1 of the present invention.

As shown in FIG. 1, motor controller 10 in the embodiment of the present invention is connected to motor 11 and speed detector 13. Motor 11 is connected with load 12. Further, speed detector 13 measures a rotational speed of a moving member (not shown) provided inside motor 11, and outputs speed detection signal Va indicating a speed amount corresponding to the rotational speed. It is to be noted that in the present embodiment, a description is given citing such an example where speed detector 13 detects as a moving amount a rotational speed amount of the moving member serving as a moving section of motor 11, as thus described.

As shown in FIG. 1, motor controller 10 is provided with speed controlling section 14, notch filters 15a and 15b, torque controlling section 16, oscillation extracting filters 17a and 17b, and notch controlling sections 18a and 18b.

Speed command signal Vt indicating a speed command value and speed detection signal Va detected by speed detector 13 are inputted into speed controlling section 14. Speed controlling section 14 calculates a deviation amount between speed command signal Vt and speed detection signal Va, and based upon this deviation amount, speed controlling section 14 generates torque command signal T1 for controlling the deviation amount to zero, and then outputs the signal. Specifically, speed controlling section 14 calculates a difference value between speed command signal Vt and speed detection signal Va, for example, and outputs a result of proportional integration of the difference value as torque command signal T1.

Torque command signal T1 is inputted from speed controlling section 14 into notch filter 15a. Further, motor controller 10 is provided with a plurality of notch filters, which are notch filters 15a and 15b, and notch filters 15a and 15b are connected in series. Notch filters 15a and 15b are filters which steeply attenuate a signal component contained in an input signal, based upon the input signal, the component having frequencies with a specific frequency at a center. This specific frequency is referred to as a notch frequency, and a width of the near frequencies to be attenuated is referred to as a notch width.

Figure 2:
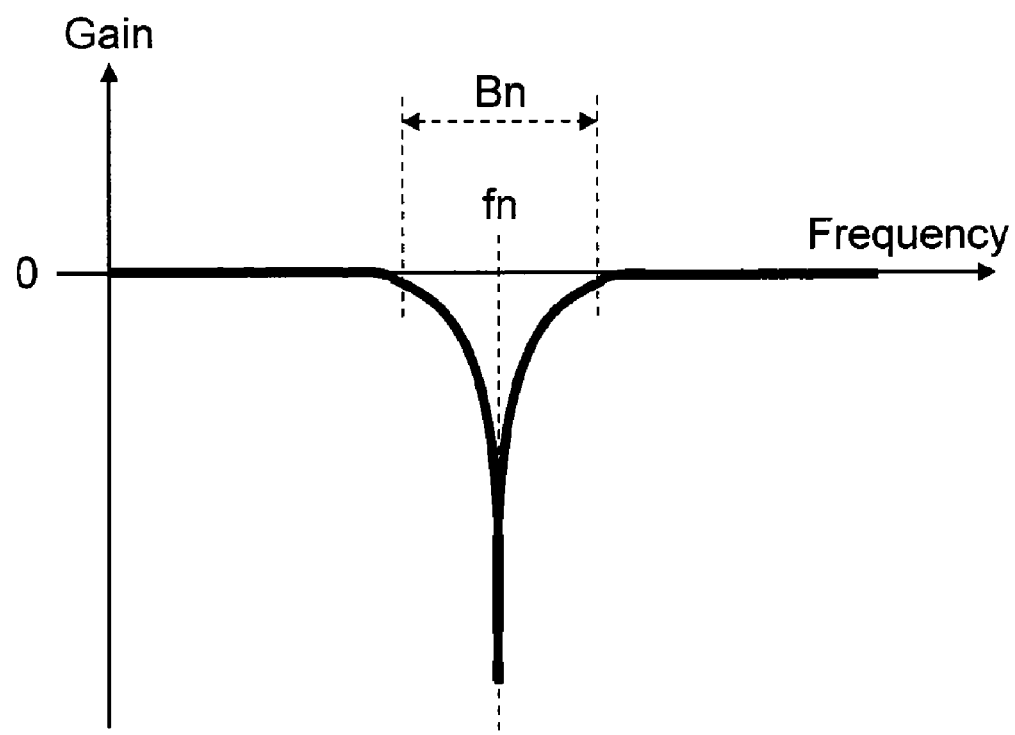
FIG. 2 is a diagram showing an example of frequency characteristics of a notch filter in the motor controller.

FIG. 2 is a diagram showing an example of frequency characteristics of notch filters 15a and 15b. FIG. 2 shows such an example of a frequency characteristic as to attenuate a signal component inside a frequency band of the near frequencies as notch width Bn with notch frequency fn at the center. Although detailed description will be given below, notch filters 15a and 15b are configured so as to be capable of varying notch frequency fn. Further, notch filters 15a and 15b are each configured so as to be capable of switching between an enable state where a filter function to make a frequency characteristic as shown in FIG. 2 is enabled and a disable state where the filter function is disabled. The enable state of each of notch filters 15a and 15b is a state where a signal component in a frequency band with a notch frequency at the center is removed from an input signal and the signal is then outputted. Further, the disable state is a state where an input signal is outputted as it is.

From notch filter 15b outputted is torque command signal T2 as a signal obtained by performing a filter process on torque command signal T1 according to need.

Torque command signal T2 outputted from notch filter 15b is inputted into torque controlling section 16. Torque controlling section 16 controls a rotational operation of motor 11 such that motor 11 outputs a target torque.

In this manner, in motor controller 10, a moving operation of the moving member is feedback-controlled through use of speed detection signal Va indicating the moving amount of the moving member, detected by speed detector 13, such that the rotational speed of the moving member becomes a rotational speed in accordance with speed command signal Vt. Thereby, a control system as a speed control system for feedback-controlling the speed is configured. Motor controller 10 has a configuration where notch filters 15a and 15b are arranged inside this speed control system.

Further, motor controller 10 is provided with a plurality of oscillation extracting filters, which are oscillation extracting filters 17a and 17b. Speed detection signal Va outputted from speed detector 13 is also supplied to these oscillation extracting filters 17a and 17b. Oscillation extracting filters 17a and 17b are set with different frequency bands as being corresponded to notch filters 15a and 15b. Then, based upon the set frequency bands, oscillation extracting filters 17a and 17b each extract an oscillating component from speed detection signal Va supplied as the moving amount of the moving member of motor 11. In other words, oscillation extracting filters 17a and 17b each extract an oscillating component that appears in inputted speed detection signal Va, such as an oscillation frequency component of mechanical resonance that occurs when load 12 is driven by motor 11, and then output the component.

Figure 3A:
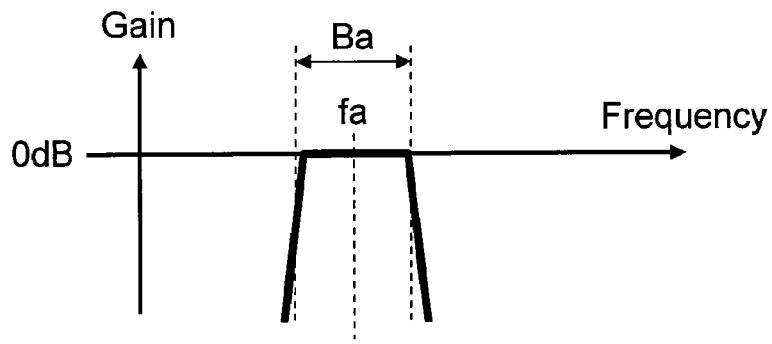
FIG. 3A is a diagram showing an example of frequency characteristics of oscillation extracting filter 17a in the motor controller.
Figure 3B:
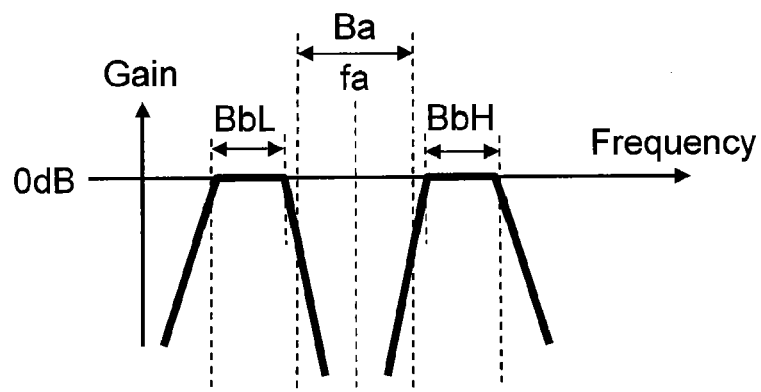
FIG. 3B is a diagram showing an example of frequency characteristics of oscillation extracting filter 17b in the motor controller.
Figure 3C:
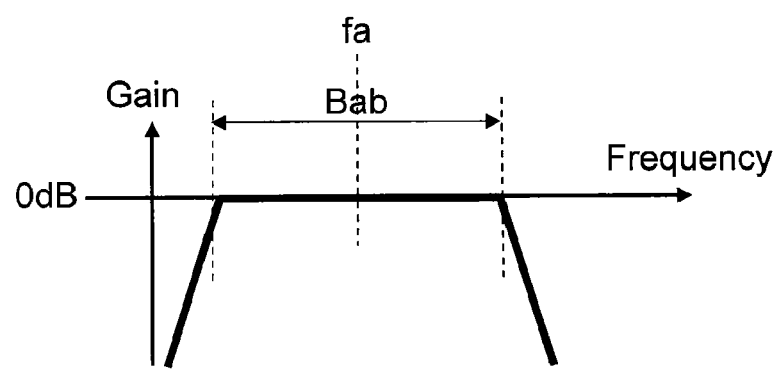
FIG. 3C is a diagram showing an example of composite frequency characteristics of an oscillation extracting filter in the motor controller.

FIG. 3A is a diagram showing an example of frequency characteristic of oscillation extracting filter 17a. Further, FIG. 3B is a diagram showing an example of frequency characteristics of oscillation extracting filter 17b. In the present embodiment, a description is given citing an example of extraction filters having such frequency characteristics as shown in FIGS. 3A and 3B. In other words, one oscillation extracting filter 17a is a band pass filter that allows passage of a signal inside predetermined frequency band Ba with center frequency fa at the center, and other oscillation extracting filter 17b is a filter having such a frequency characteristic as to allow passage of a signal outside frequency band Ba of oscillation extracting filter 17a. More specifically, a frequency characteristic obtained by composition of oscillation extracting filter 17a and oscillation extracting filter 17b is such a composite frequency characteristic as to form frequency band Bab with center frequency fa at the center, as shown in FIG. 3C. In other words, oscillation extracting filter 17b blocks passage of a signal inside frequency band Ba with center frequency fa at the center. Along with this, oscillation extracting filter 17b allows passage of a signal, having a frequency lower than a lower-side frequency of frequency band Ba, in a range inside band BbL and allows passage of a signal, having a frequency higher than an upper-side frequency of frequency band Ba, in a range inside band BbH. In this manner, in the plurality of oscillation extracting filters, one oscillation extracting filter 17b takes the pass frequency band of other oscillation extracting filter 17a as a stop frequency band. Especially, in the present embodiment, the frequency characteristics of the plurality of oscillation extracting filters are set to be complementary as just described. Therefore, for example, even in the case of mechanical resonance containing a plurality of frequency components, such a plurality of oscillation extracting filters are provided, thereby to make each frequency component in the plurality of frequency components extractable in an individual and parallel manner.

It should be noted that as a concrete method for realizing oscillation extracting filters 17a and 17b, for example when a transfer characteristic of oscillation extracting filter 17a is referred to as Ga, a transfer characteristic of oscillation extracting filter 17a is referred to as (1−Ga), thereby to facilitate obtainment of such respectively complementary frequency characteristics. Further, a broad band pass filter having such a frequency characteristic as shown in FIG. 3C can be previously cascade-connected to each of the oscillation extracting filters, thereby to obtain such a composite frequency as shown in FIG. 3C. In other words, a broad band pass filter with a transfer characteristic referred to as Gw may be arranged, and a transfer characteristic on the oscillation extracting filter 17a side may be referred to as Gw·Ga, while a transfer characteristic on the oscillation extracting filter 17b side may be referred to as Gw·(1−Ga).

In this manner, by setting frequency characteristics of a plurality of oscillation extracting filters to be complementary, even in a case of mechanical resonance containing one frequency component, the component can be detected by any oscillation extracting filter. Along with this, even in a case of mechanical resonance containing two frequency components, each of the frequency components can be detected.

Oscillation extracting filters 17a and 17b each output an oscillating component signal as a signal having passed therethrough based upon such a frequency characteristic, namely a signal obtained by extracting an oscillating component that appeared in speed detection signal Va.

The oscillating component signal extracted by oscillation extracting filter 17a is supplied to notch controlling section 18a. The oscillating component signal extracted by oscillation extracting filter 17b is supplied to notch controlling section 18b. Motor controller 10 is provided with a plurality of notch controlling sections, notch controlling section 18a and notch controlling section 18b, which are arranged with respect to respective oscillation extracting filters 17a and 17b. Notch controlling section 18a controls notch filter 15a in accordance with a result of the extraction of the oscillating component signal by oscillation extracting filter 17a. Notch controlling section 18b controls notch filter 15b in accordance with a result of the extraction of the oscillating component signal by oscillation extracting filter 17b. In particular, upon determination that an oscillating component signal has been detected by oscillation extracting filter 17a, notch controlling section 18a controls the notch frequency of corresponding notch filter 15a so as to decrease an amplitude of the oscillating component signal extracted by oscillation extracting filter 17a. Similarly, upon determination that an oscillating component signal has been detected by oscillation extracting filter 17b, notch controlling section 18b controls the notch frequency of corresponding notch filter 15b so as to decrease an amplitude of the oscillating component signal extracted by oscillation extracting filter 17b. Further, notch controlling sections 18a and 18b also respectively perform such operations as to switch notch filters 15a and 15b between the enable state and the disable state. Moreover, in order to determine in each of notch controlling sections 18a and 18b that an oscillating component signal has been detected, for example, such a configuration as follows can be employed. That is, each of the notch control sections determines that an oscillating component signal has been detected when an amplitude of an oscillating component exceeds a predetermined level, and starts control of a notch frequency of the corresponding notch filter. With such a configuration, it is possible to prevent a malfunction due to such a noise component not higher than a predetermined level.

Figure 4:
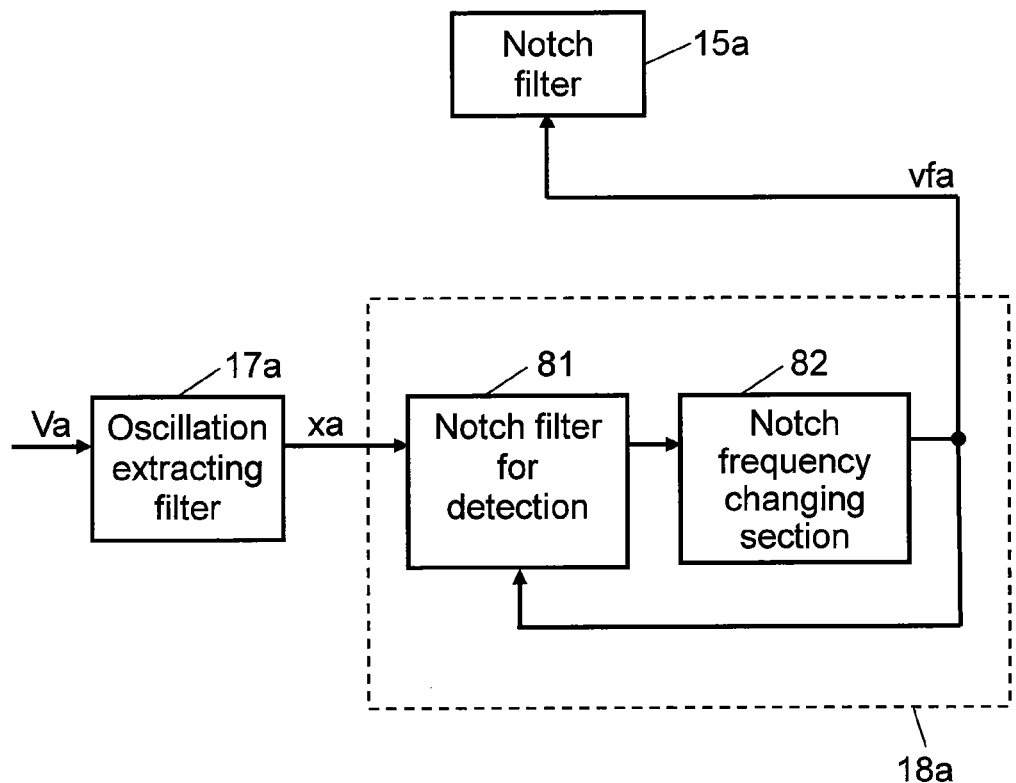
FIG. 4 is a block diagram showing a main section of the motor controller.

FIG. 4 is a block diagram showing a main section of motor controller 10. Next, with reference to FIG. 4, a detailed configuration for controlling the notch filter is described based upon an oscillating component signal extracted by the oscillation extracting filter. It is to be noted that, although only a configuration including oscillation extracting filter 17a, notch controlling section 18a and notch filter 15a is shown in FIG. 4, oscillation extracting filter 17b, notch controlling section 18b and notch filter 15b also form a similar configuration, and respectively perform similar operations in parallel.

First, as shown in FIG. 4, notch controlling section 18a has notch filter 81 for detection and notch frequency changing section 82. Notch filter 81 for detection is a notch filter equivalent to notch filter 15a. Notch filter 81 for detection is supplied with oscillating component signal xa extracted by oscillation extracting filter 17a. Further, notch frequency changing section 82 changes and controls a notch frequency of notch filter 81 for detection so as to decrease an amplitude of an output signal of notch filter 81 for detection. In order to perform such change control, notch frequency changing section 82 is supplied with the output signal of notch filter 81 for detection. Notch frequency changing section 82 then detects the amplitude of this output signal, as well as generating notch frequency control signal vfa for changing and controlling the notch frequency of notch filter 81 for detection, and outputs the signal to notch filter 81 for detection.

Incidentally, notch controlling section 18a is provided for a purpose of generating notch frequency control signal vfa. In this case, notch frequency control signal vfa is a control signal corresponding to a frequency at which the amplitude of oscillating component signal xa is suppressed most by notch filter 81 for detection. In other words, the output signal of notch filter 81 for detection is regarded as an error, and such an optimal frequency as to minimize this error may be detected. As for a technique to minimize an error in this manner, for example, such a technique as to be referred to as a gradient method is known. Above-described notch controlling section 18a may be configured through use of such a technique as the gradient method, whereby it is possible to obtain notch frequency control signal vfa corresponding to the frequency at which the amplitude of oscillating component signal xa is suppressed most. A similar operation can also be applied to notch controlling section 18b.

With such a configuration of notch controlling section 18a, notch frequency changing section 82 changes and controls the notch frequency of notch filter 81 for detection by means of notch frequency control signal vfa so as to decrease the amplitude of the output signal of notch filter 81 for detection. In other words, notch frequency control signal vfa is a signal corresponding to the frequency of oscillating component signal xa extracted by oscillation extracting filter 17a.

Further, in the present embodiment, the notch frequency of notch filter 15a is controlled by notch controlling section 18a having such a configuration. For this reason, for example, immediately upon detection of oscillating component signal xa, the change control of the notch frequency of notch filter 15a is started. That is, suppression of the oscillation can be immediately started without the need for the time for estimating the frequency, and the like, as in FFT.

Notch frequency control signal vfa generated in this manner is supplied to notch filter 15a. In this case, notch frequency control signal vfa is a signal corresponding to the frequency of oscillating component signal xa, and notch filter 81 for detection and notch filter 15a are equivalent notch filters. For this reason, inside the speed control system, notch filter 15a can also suppress an oscillating component contained in torque command signal T1 corresponding to the frequency of oscillating component signal xa.

Particularly, as described above, in the present embodiment, the configuration including oscillation extracting filter 17b, notch controlling section 18b and notch filter 15b is provided in parallel with the configuration including oscillation extracting filter 17a, notch controlling section 18a and notch filter 15a, shown in FIG. 4. Accordingly, even in the case of mechanical resonance containing a plurality of frequency components, operations are performed in parallel in the respective configurations so as to simultaneously and individually suppress the respective frequency components contained in the mechanical resonance. As thus described, motor controller 10 of the present embodiment is capable of constantly performing stable control of motor 11.

Next, an operation of motor controller 10 is described.

Figure 5:
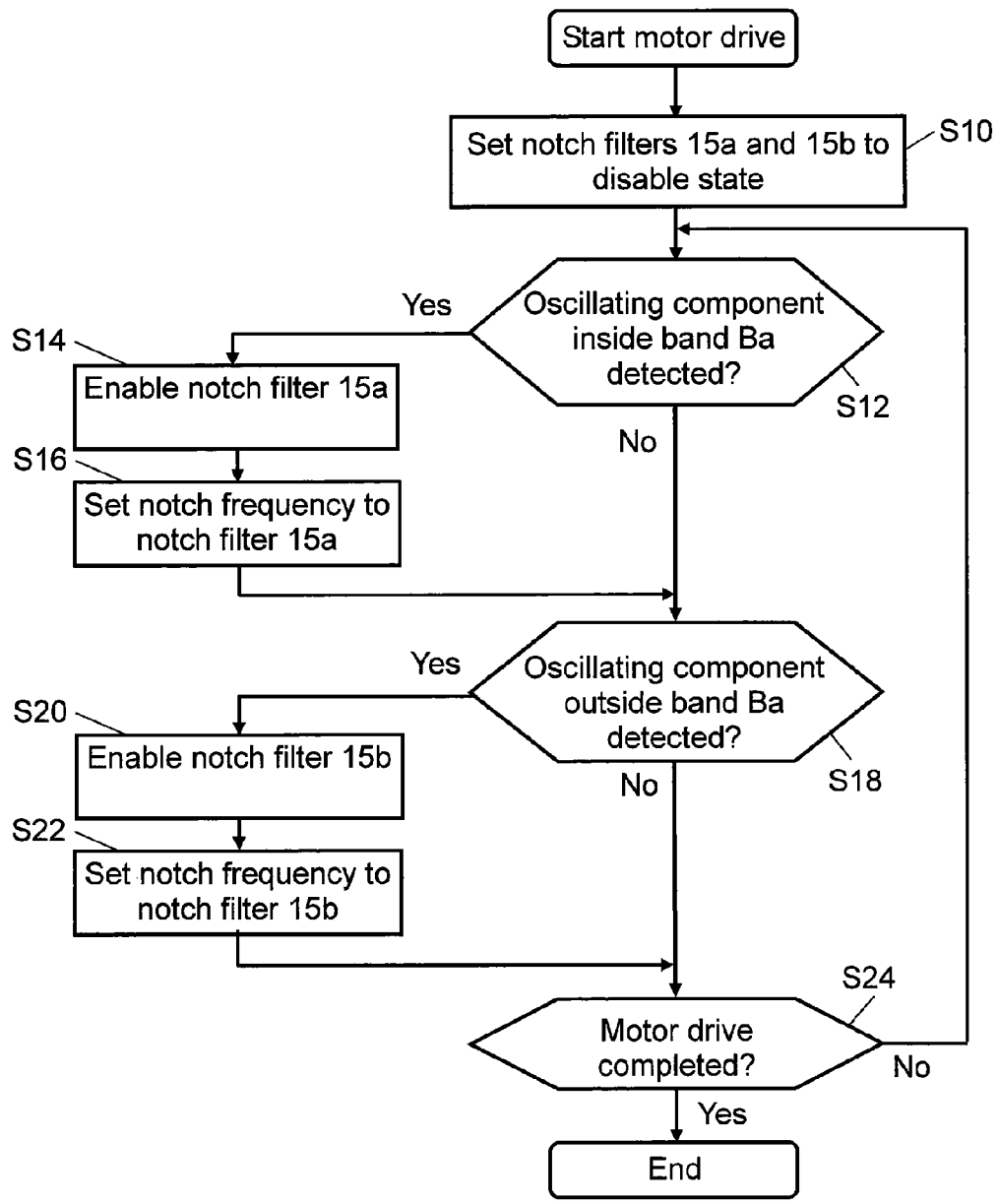
FIG. 5 is a flowchart showing a procedure of the motor controller when driving a motor.

FIG. 5 is a flowchart showing a procedure of motor controller 10 when driving the motor. In the following, the operation of motor controller 10 is described with reference to FIG. 5.

When such a command as to start driving of load 12 by motor 11 is made by such a device like a host device as to control motor controller 10, motor controller 10 starts drive-control of motor 11.

First, motor controller 10 sets notch filters 15a and 15b to the disable state (step S10). Along with this, motor controller 10 drive-controls motor 11 so as to rotate at a speed corresponding to speed command signal Vt. At this time, the rotational speed of the moving member of motor 11 is sequentially detected by speed detector 13 and outputted as speed detection signal Va.

Speed detection signal Va from speed detector 13 is supplied to oscillation extracting filters 17a and 17b. Notch controlling section 18a determines whether or not oscillation extracting filter 17a detected from speed detection signal Va an oscillating component having a frequency inside frequency band Ba as shown in FIG. 3A (step S12). For performing such a determination, notch controlling section 18a, for example, monitors whether or not an amplitude of the oscillating component extracted by oscillation extracting filter 17a exceeds a predetermined level.

When notch controlling section 18a determines that this amplitude exceeds the predetermined level, motor controller 10 regards the oscillating component as having been detected, and proceeds to step S14 in FIG. 5, to start variable control of the notch frequency of notch filter 15a. In other words, first, notch controlling section 18a switches notch filter 15a from the disable state to the enable state (step S14). Next, notch controlling section 18a supplies a generated notch frequency control signal to notch filter 15a. Thereby, a notch frequency of the frequency of the oscillating component extracted by oscillation extracting filter 17a is set to notch filter 15a (step S16). Subsequently, motor controller 10 proceeds to a process of step S18.

Further, when notch controlling section 18a determines in step S12 that the amplitude of the oscillating component does not exceed the predetermined level, motor controller 10 proceeds to step S18.

Next, notch controlling section 18b determines whether or not oscillation extracting filter 17b has detected from speed detection signal Va an oscillating component having a frequency inside band BbL or inside band BbH, which is outside frequency band Ba, as shown in FIG. 3B (step S18). For performing such a determination, notch controlling section 18b, for example, monitors whether or not an amplitude of the oscillating component extracted by oscillation extracting filter 17b exceeds a predetermined level.

When notch controlling section 18b determines that this amplitude exceeds the predetermined level, motor controller 10 regards the oscillating component as having been detected, and proceeds to step S20 in FIG. 5, to start variable control of the notch frequency of notch filter 15b. In other words, first, notch controlling section 18b switches notch filter 15b from the disable state to the enable state (step S20). Next, notch controlling section 18b supplies a generated notch frequency control signal to notch filter 15b. Thereby, a notch frequency of the frequency of the oscillating component extracted by oscillation extracting filter 17b is set to notch filter 15b (step S22). Subsequently, motor controller 10 proceeds to a process of step S24.

Further, when notch controlling section 18b determines in step S18 that the amplitude of the oscillating component does not exceed the predetermined level, motor controller 10 proceeds to step S24.

Motor controller 10 determines whether or not such a command as to complete the driving of load 12 by motor 11 has been made from the host device or the like (step S24). When such a command as to complete the driving has not been made, motor controller 10 proceeds to the process of step S12, and when such a command as to complete the driving is made, motor controller 10 completes the driving of load 12 by motor 11. It is to be noted that FIG. 5 is a flowchart in the case of first driving the motor controller. In the case of restarting the motor drive by the same motor, the processes are restarted from step S12.

As described above, the motor controller of the present embodiment is configured to include: a plurality of notch filters which are arranged inside the control system; a plurality of oscillation extracting filters which extract oscillating components from a speed detection signal based upon frequency bands set so as to be respectively different frequency bands; and a plurality of notch controlling sections which control the notch frequencies of the notch filters so as to decrease amplitudes of the oscillating components extracted by the oscillation extracting filters. Accordingly, even when mechanical resonance that occurs in the case of driving the load contains a plurality of frequency components, the respective frequency components in the plurality of frequency components are individually and parallelly extracted by the plurality of oscillation extracting filters. Further, the notch controlling sections and the notch filters also operate in parallel, while corresponding to the individual frequency components. Therefore, according to the motor controller of the present embodiment, it is possible to execute a suppressing operation in parallel with respect to each frequency component of mechanical resonance containing a plurality of frequency components, or the like, so as to accurately and immediately suppress an oscillation thereof.

Further, in the motor controller of the present embodiment, as described with reference to FIG. 5, the notch filter is set as in the disable state at the time of starting the drive-control. In other words, when an oscillating component caused by mechanical resonance or the like is not detected, the speed control system is configured in such a state where no notch filter is present and torque command signal T1 from speed controlling section 14 is directly supplied to torque controlling section 16. Therefore, the present speed control system can operate in a broad band in the case where the mechanical resonance or the like does not occur, so as to ensure sufficient responsiveness.

It is to be noted that in the present embodiment, the description has been given citing the configurational example where two each of notch filters, oscillation extracting filters and notch controlling sections were provided, but the numbers of those filters and sections are not restricted thereto, as long as those filters and sections are provided in plural numbers. Further, at this time, each of the oscillation extracting filters may be a band pass filter set with a different pass frequency band, or one oscillation extracting filter in the plurality of oscillation extracting filters may take each of pass frequency bands of the other oscillation extracting filters as a stop frequency band.

Embodiment 2

Figure 6:
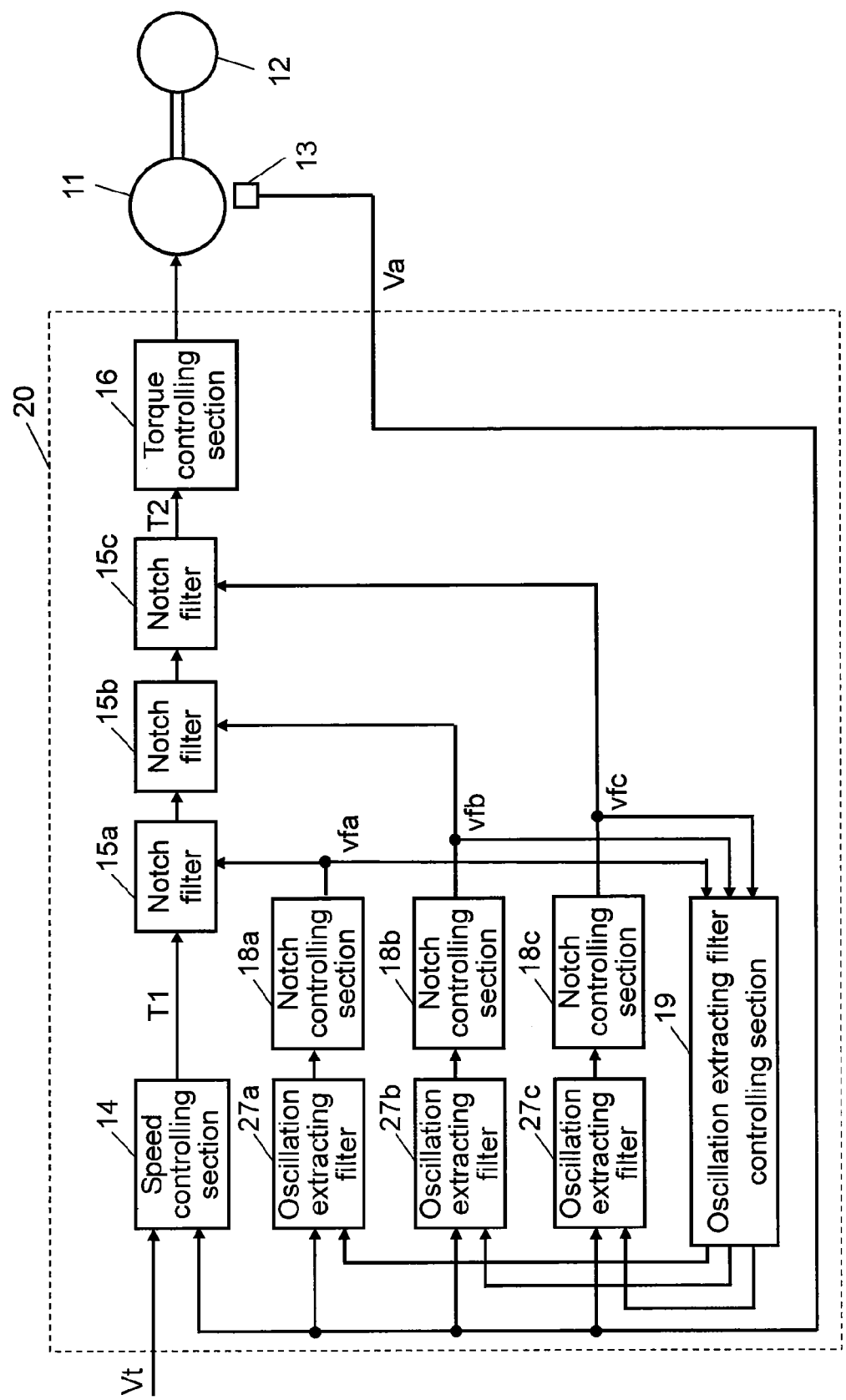
FIG. 6 is a block diagram of a motor controller in Embodiment 2 of the present invention.

FIG. 6 is a block diagram of motor controller 20 in Embodiment 2 of the present invention. In Embodiment 2, a description is given citing an example where motor controller 20 is provided with three each of oscillation extracting filters, notch controlling sections and notch filters. Further, compared with Embodiment 1, the controller is further provided with oscillation extracting filter controlling section 19 in Embodiment 2. Oscillation extracting filter controlling section 19 is supplied with a notch frequency control signal outputted from each of the notch controlling sections. Oscillation extracting filter controlling section 19 changes and controls a frequency characteristic of each of the oscillation extracting filters based upon the supplied notch frequency control signal. It is to be noted that in FIG. 6, the same constituents as those in FIG. 1 are provided with the same reference numerals, and detailed descriptions thereof are not given.

As shown in FIG. 6, speed detection signal Va outputted from speed detector 13 is supplied to oscillation extracting filters 27a, 27b and 27c, as well as to speed controlling section 14. Each of oscillation extracting filters 27a, 27b and 27c has a function to extract an oscillating component from speed detection signal Va in a similar manner to oscillation extracting filter 17a, and the like, of Embodiment 1, and is also configured so as to be able to change a frequency characteristic by control of oscillation extracting filter controlling section 19.

An oscillating component signal extracted by oscillation extracting filter 27a is supplied to notch controlling section 18a. In a similar manner to Embodiment 1, notch controlling section 18a generates notch frequency control signal vfa for changing and controlling a notch frequency of notch filter 15a in accordance with a result of the extraction of the oscillating component signal by oscillation extracting filter 27a. Similarly, an oscillating component signal extracted by oscillation extracting filter 27b is supplied to notch controlling section 18b. Notch controlling section 18b generates notch frequency control signal vfb for changing and controlling a notch frequency of notch filter 15b. An oscillating component signal extracted by oscillation extracting filter 27c is supplied to notch controlling section 18c. Notch controlling section 18c generates notch frequency control signal vfc for changing and controlling a notch frequency of notch filter 15c. In the present embodiment, notch frequency control signals vfa, vfb and vfc are also supplied to oscillation extracting filter controlling section 19.

Oscillation extracting filter controlling section 19 generates an oscillation extracting filter control signal for changing and controlling a frequency characteristic of each of the oscillation extracting filters based upon the supplied notch frequency control signal, and supplies the signal to each of the oscillation extracting filters. As described above, for example, notch frequency control signal vfa is a signal corresponding to a frequency of oscillating component signal xa extracted by oscillation extracting filter 27a. Each of the oscillation extracting filters is frequency-controlled such that, for example, its center frequency becomes a frequency indicated by the notch frequency control signal. In other words, oscillation extracting filter controlling section 19 feeds back an oscillation extracting filter control signal, generated based upon such a notch frequency control signal, to the oscillation extracting filter. By such feedback control, for example, the oscillation extracting filter is controlled such that a center frequency of its pass band comes close to or agree with the frequency of the oscillating component signal. It is thereby possible to enhance the accuracy in extraction of an oscillating component by the oscillation extracting filter from speed detection signal Va.

Next, an operation of motor controller 20 is described with a particular emphasis on an operation of oscillation extracting filter controlling section 19 for controlling the oscillation extracting filters.

Figure 7A:
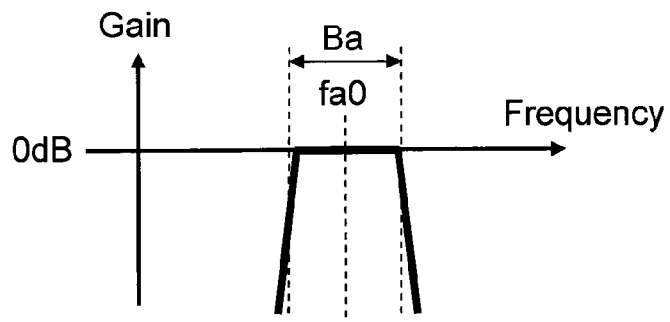
FIG. 7A is a diagram showing an example of frequency characteristic of oscillation extracting filter 27a at start of an operation of the motor controller.
Figure 7B:
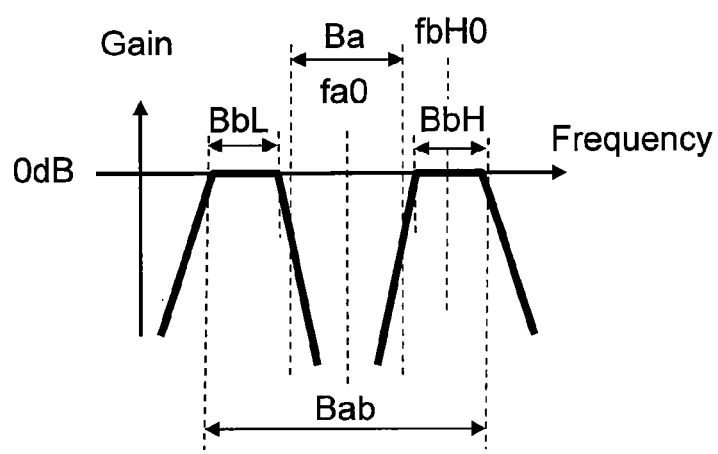
FIG. 7B is a diagram showing an example of frequency characteristic of oscillation extracting filter 27b at start of the operation of the motor controller.
Figure 7C:
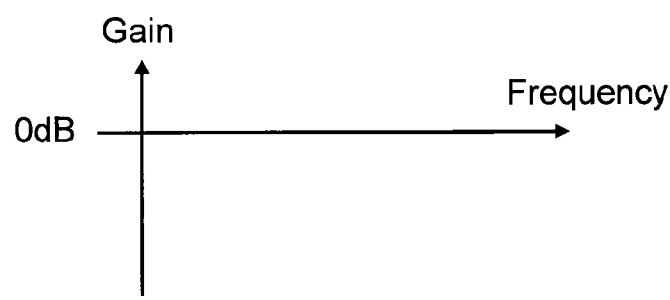
FIG. 7C is a diagram showing an example of frequency characteristic of oscillation extracting filter 27c at start of the operation of the motor controller.
Figure 8A:
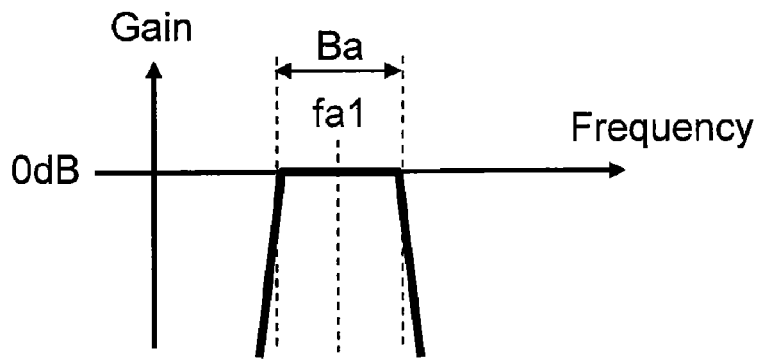
FIG. 8A is a diagram showing an example of frequency characteristic of oscillation extracting filter 27a at detection of an oscillating component from a speed detection signal in the motor controller.
Figure 8B:
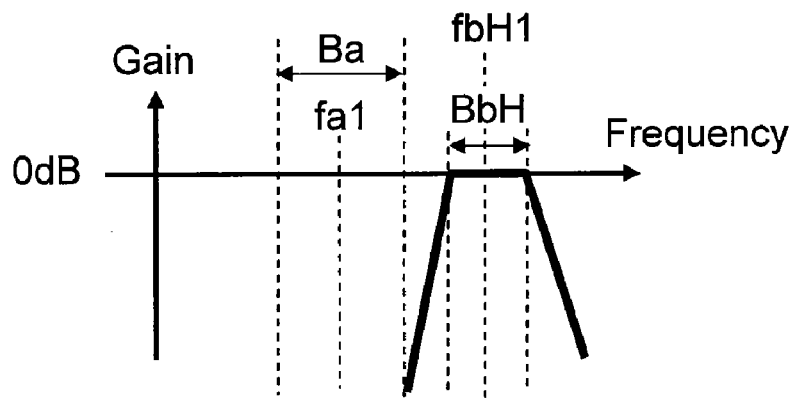
FIG. 8B is a diagram showing an example of frequency characteristic of oscillation extracting filter 27b at detection of an oscillating component from the speed detection signal in the motor controller.
Figure 8C:
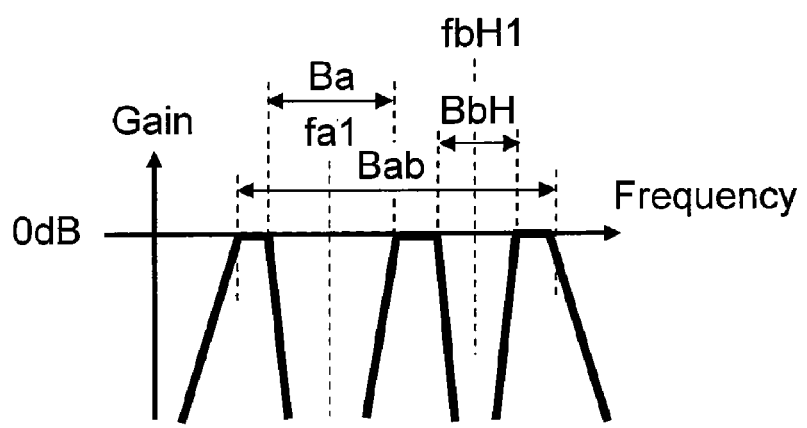
FIG. 8C is a diagram showing an example of frequency characteristic of oscillation extracting filter 27c at detection of an oscillating component from the speed detection signal in the motor controller.
Figure 9:
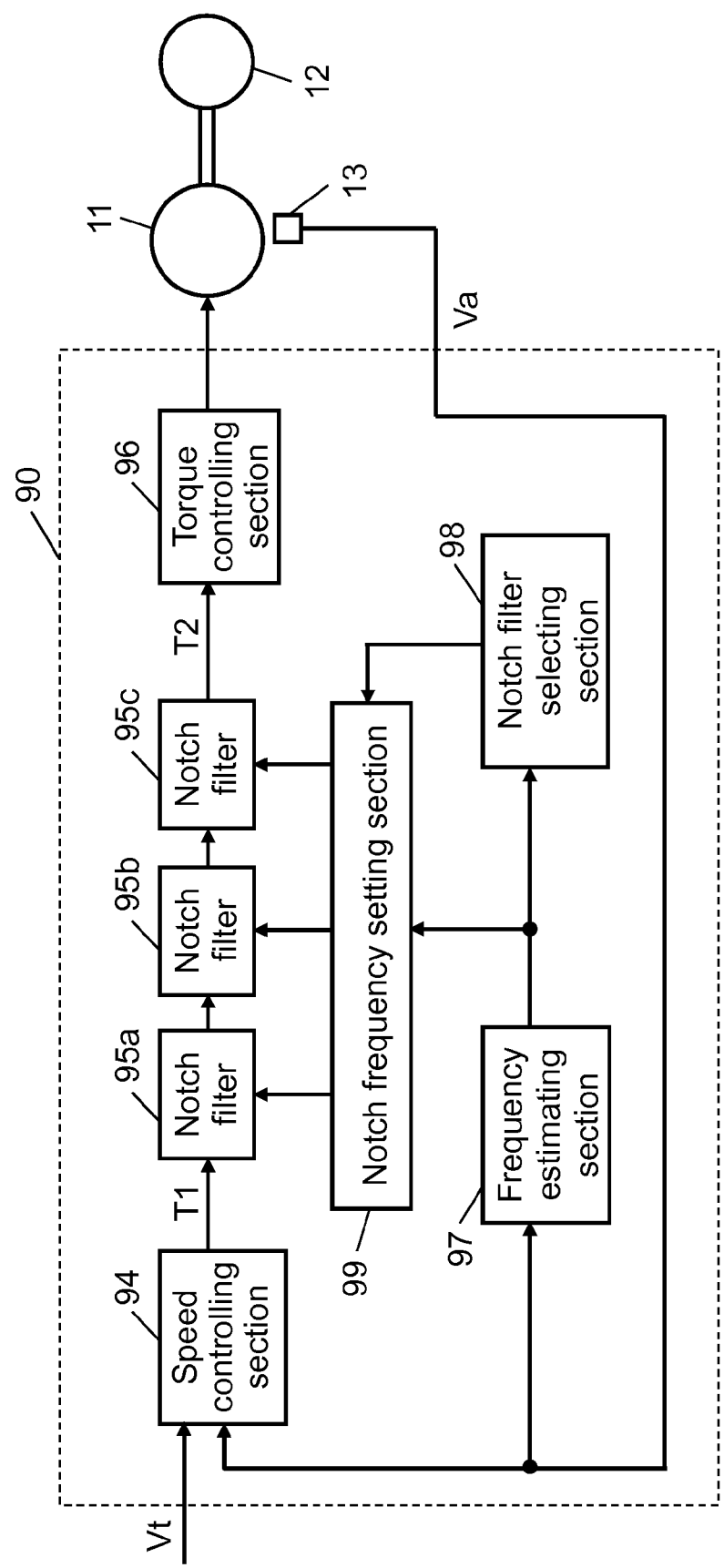
FIG. 9 is a block diagram of a conventional motor controller.

FIGS. 7A, 7B and 7C are diagrams each showing an example of frequency characteristics of each of the oscillation extracting filters at start of an operation of motor controller 20. FIGS. 8A, 8B and 8C are diagrams each showing an example of frequency characteristics of each of the oscillation extracting filters at detection of an oscillating component from speed detection signal Va.

First, in FIGS. 7A, 7B and 7C, FIG. 7A shows an example of frequency characteristics of oscillation extracting filter 27a, FIG. 7B shows that of oscillation extracting filter 27b, and FIG. 7C shows that of oscillation extracting filter 27c. Upon start of a drive operation by motor controller 20, such as upon power-on thereof, as shown in FIGS. 7A, 7B and 7C, oscillation extracting filters 27a and 27b are set to have similar frequency characteristics as oscillation extracting filters 17a and 17b in Embodiment 1. In other words, oscillation extracting filter 27a is set to have a band pass filter characteristic that allows passage of a signal inside predetermined frequency band Ba with center frequency fa0 at the center. Further, oscillation extracting filter 27b is set to have a filter characteristic having such a frequency characteristic as to allow passage of a signal outside frequency band Ba of oscillation extracting filter 27a. Moreover, oscillation extracting filter 27c is set at a start of the driving operation so as to have a characteristic that prevents passage of a signal containing every frequency component, namely a complete blocking characteristic, as shown in FIG. 7C.

In this manner, in the present embodiment, there are provided at least one oscillation extracting filter 27a that allows passage of a signal inside a frequency band, one oscillation extracting filter 27b that takes a pass frequency band of oscillation extracting filter 27a as a stop frequency band and allows passage of a signal outside the stop frequency band, and oscillation extracting filter 27c that blocks passage of a signal.

Subsequently, when such an oscillating component as to be caused by mechanical resonance is generated in speed detection signal Va, the oscillating component passes through at least either oscillation extracting filter 27a or oscillation extracting filter 27b. Its oscillating component signal is then supplied to at least either notch controlling section 18a or notch controlling section 18b. Thereby, notch controlling section 18a or notch controlling section 18b starts an operation corresponding to the supplied oscillating component signal.

In the following, a detailed operation of motor controller 20 is described.

First, when an oscillating component containing a frequency component inside frequency band Ba shown in FIG. 7A is generated, since a signal with the frequency component inside frequency band Ba shown in FIG. 7A passes through oscillation extracting filter 27a, notch controlling section 18a controls a notch frequency of notch filter 15a by means of notch frequency control signal vfa. Along with this, notch frequency control signal vfa is supplied to oscillation extracting filter controlling section 19. Oscillation extracting filter controlling section 19 then frequency-controls oscillation extracting filter 27a such that the center frequency of oscillation extracting filter 27a becomes a frequency corresponding to notch frequency control signal vfa. FIG. 8A shows the frequency characteristic of oscillation extracting filter 27a controlled in this manner. In other words, oscillation extracting filter 27a is changed and controlled by oscillation extracting filter controlling section 19 from initial center frequency fa0 to center frequency fa1 as a frequency of the oscillating component signal or a near frequency thereof, as shown in FIG. 8A. It is to be noted that at this time, the configuration may, for example, be added with such change control of the frequency band as to narrow frequency band Ba, along with the change control of the center frequency, so that the oscillating component can be more accurately extracted.

Further, also in the present embodiment, oscillation extracting filters 27a and 27b have mutually complementary frequency characteristics, and hence the frequency characteristic of oscillation extracting filter 27b is also changed associated with the change control of oscillation extracting filter 27a. For example, when a transfer characteristic of oscillation extracting filter 27a is changed from Gw·Ga0 to Gw·Ga1, a transfer characteristic of oscillation extracting filter 27b is changed from Gw·(1−Ga0) to Gw·(1−Ga1). It should be noted that transfer characteristic Gw is a broad band pass filter characteristic as in FIG. 3C, and transfer characteristics Ga0 and Ga1 are band pass filter characteristics as shown in FIG. 8A.

Moreover, after changing and controlling the oscillation extracting filters, oscillation extracting filter controlling section 19 determines whether or not an oscillating component has been detected in every oscillation extracting filter set with the pass band. When determining that an oscillating component has not been detected in every oscillation extracting filter, for example, when an oscillating component is detected only by oscillation extracting filter 27a, oscillation extracting filters 27a and 27b are changed and controlled in the manner as thus described. Similarly, also when an oscillating component is detected only by oscillation extracting filter 27b, a similar control change is performed.

On the other hand, when an oscillating component is detected also by oscillation extracting filter 27b in addition to oscillation extracting filter 27a, the following operation is further performed. In the following, a description will be given citing an example of cases where an oscillating component is further generated which contains a frequency component in an upper-side pass band of oscillation extracting filter 27b in a state of having upper and lower pass bands.

Since a signal with a frequency component in the upper-side pass band of oscillation extracting filter 27b passes through oscillation extracting filter 27b, notch controlling section 18b controls the notch frequency of notch filter 15b by means of notch frequency control signal vfb. Along with this, notch frequency control signal vfb is supplied to oscillation extracting filter controlling section 19. Oscillation extracting filter controlling section 19 then frequency-controls oscillation extracting filter 27b such that a center frequency of the upper-side pass band of oscillation extracting filter 27b becomes a frequency corresponding to notch frequency control signal vfb.

Further, oscillation extracting filter controlling section 19 monitors the number of oscillating components detected, and when determining that an oscillating component has been detected in every oscillation extracting filter set with the pass band as described above, oscillation extracting filter controlling section 19 performs such control as follows on the oscillation extracting filters.

First, by control of oscillation extracting filter controlling section 19, as shown in FIG. 8B, the frequency characteristic of oscillation extracting filter 27b is changed to a band pass filter characteristic with center frequency fbH1 at the center, which is a frequency of the oscillating component signal or a near frequency thereof. In other words, in the present embodiment, when every oscillation extracting filter in a state of allowing passage of a signal extracts an oscillating component, oscillation extracting filter controlling section 19 first changes oscillation extracting filter 27b that allows passage of a signal outside the stop frequency band, to have a frequency characteristic that allows passage of a signal inside a frequency band including the frequency of the extracted oscillating component.

Next, oscillation extracting filter controlling section 19 sets the frequency characteristic of oscillation extracting filter 27c by use of information on the frequency characteristics set to oscillation extracting filter 27a and oscillation extracting filter 27b. Specifically, as shown in FIG. 8C, oscillation extracting filter controlling section 19 sets to oscillation extracting filter 27c a filter characteristic having such a frequency characteristic as to take each of the pass bands of oscillation extracting filters 27a and 27b as a stop band. In other words, such a frequency characteristic is set as to allow passage of a signal outside frequency band Ba of oscillation extracting filter 27a and frequency band BbH of oscillation extracting filter 27b. In other words, in the present embodiment, when every oscillation extracting filter in the state of allowing passage of a signal extracts an oscillating component, oscillation extracting filter controlling section 19 further changes oscillation extracting filter 27c, to have a frequency characteristic of taking each of the pass frequency bands of oscillation extracting filter 27a and oscillation extracting filter 27b that allow passage of a signal inside the frequency bands as a stop frequency band, and allowing passage of a signal outside the stop frequency band.

When an example of the change control of each of the oscillation extracting filters described above is described by means of transfer characteristics, first, upon change in the transfer characteristic of oscillation extracting filter 27a from Gw·Ga0 to Gw·Ga1, the transfer characteristic of oscillation extracting filter 27b is changed from Gw·(1−Ga0) to Gw·(1−Ga1). Further, upon detection of an oscillating component in oscillation extracting filter 27b, the transfer characteristic of oscillation extracting filter 27b is changed from Gw·(1−Ga1) to such a transfer characteristic as to be a band pass filter characteristic being transfer characteristic Gw·Gb. Since the oscillating component has been detected in every oscillation extracting filter set with the pass band, oscillation extracting filter 27c is changed and controlled from the complete blocking characteristic to transfer characteristic Gw·(1−Ga1−Gb). It should be noted that transfer characteristic Gw is a broad band pass filter characteristic as in FIG. 3C, and transfer characteristics Ga0, Ga1 and Gb are band pass filter characteristics.

As described above, the description has been given in the present embodiment citing the example where three pairs each including the oscillation extracting filter, the notch controlling section and the notch filter were provided, but for example, the following configuration may also be employed. In other words, four or more pairs each including the oscillation extracting filter, the notch controlling section and the notch filter are prepared. Further, frequency characteristics of the oscillation extracting filters in two pairs out of those pairs are set so as to be complementary, for example as shown in FIGS. 7A and 7B. Moreover, the oscillation extracting filters in the other pairs are set so as to have a complete blocking characteristic as shown in FIG. 7C. When motor controller 20 starts its driving operation and oscillation extracting filter controlling section 19 determines that two oscillating components has been detected, a frequency characteristic of a third oscillation extracting filter is set as described above. Further, when a third oscillating component is detected through the third oscillation extracting filter, such a frequency characteristic as to take a pass band of the third oscillation extracting filter as a stop band is set to a fourth oscillation extracting filter. In this manner, such a configuration may be employed where, every time a new oscillating component is detected, a frequency characteristic of the oscillation extracting filter is set so as to become such a frequency characteristic as described above from the complete blocking characteristic.

Moreover, as described above, the description has been given in the present embodiment citing such an example as to make the mutually complementary two oscillation extracting filters operate at the start of the driving operation by motor controller 20, but such a configuration is also possible where, at the start of the operation, only one oscillation extracting filter is set so as to have a band pass filter characteristic while the other oscillation extracting filters are set so as to have a complete blocking characteristic. In other words, when a description is given by means of transfer characteristics, first, one oscillation extracting filter is set to have such a broad band pass filter characteristic so as to be transfer characteristic Gw. When an oscillation component passing through this oscillation extracting filter is detected, this oscillation extracting filter is changed and controlled to have transfer characteristic Gw·Ga which is such a narrow band pass filter characteristic as to allow passage of a vicinity of the frequency of the detected oscillating component. Along with this, one of the oscillation extracting filters having the complete blocking characteristic is changed and controlled, to have transfer characteristic Gw·(1−Ga). Then, as described above, the oscillation extracting filter with the complete blocking characteristic is sequentially set to a signal passage filter in accordance with detection of an oscillating component passing through each of the oscillation extracting filters. Such a configuration may also be employed.

As described above, motor controller 20 of the present embodiment is configured such that a plurality of pairs each including the oscillation extracting filter, the notch controlling section and the notch filter are prepared, and frequency characteristics of the oscillation extracting filters in two pairs out of those pairs are set so as to be complementary, and the oscillation extracting filters in the other pairs are set so as to have the complete blocking characteristic. Then, every time an oscillation component exceeding two oscillating components is newly detected, oscillation extracting filter controlling section 19 sets the oscillation extracting filter with the complete blocking characteristic, to have such a frequency characteristic as to take each of the already set pass bands of the oscillation extracting filter as a stop band. With such a configuration, a suppressing operation on an oscillation of mechanical resonance containing a plurality of frequency components can be accurately and immediately started, and also in the case of complex mechanical resonance containing a large number of frequency components, an oscillation thereof can be suppressed while corresponding to each frequency.

It is to be noted that in each of the foregoing embodiments, the description has been given citing the example of such a speed control system as to detect a rotational speed of the moving member as the moving section, and feedback-control a moving operation of the moving section through use of the detected speed amount. The present invention is not restricted to such a configuration, and for example, it may be such a position control system as to detect a position of the moving section, and feedback-control a moving operation of the moving section through use of the detected positional information. Further, in the case of the position control system, it may be configured to estimate an oscillation frequency from the detected positional information. Moreover, a configuration may, for example, be formed by separately providing such a detector as to fetch a signal for extracting an oscillating component, other than the signal for detecting the speed or position.

Further, in each of the foregoing embodiments, the description has been given citing such an example as to detect a speed of the motor moving section. The present invention is not restricted to such a configuration and may, for example, be configured so as to extract an oscillating component by means of a signal from a detector provided in the load or in a vicinity of the load.

Moreover, in each of the foregoing embodiments, the description has been given citing the example of a motor provided with such a moving member as to perform a rotational operation as the moving section. The present invention is not restricted to such a configuration and may, for example, be a motor that performs a moving operation other than the rotation, such as a linear motor.

Furthermore, in each of the foregoing embodiments, the description has been given citing the example of such an embodiment where the motor controller of the present invention is configured by such a functional block, for example as shown in FIG. 1. The present invention is not restricted to such a configuration and may, for example, be such a motor controlling method where a process in each block is realized by execution of steps in accordance with a procedure. Specifically, such a configuration may be employed where a program that sequentially executes steps corresponding to the process in each block is stored into a memory or the like, and for example, a CPU such as a microprocessor sequentially reads the program stored in the memory and executes the processes in accordance with the read program.

INDUSTRIAL APPLICABILITY

Since a motor controller according to the present invention is capable of accurately and immediately suppressing even an oscillation of mechanical resonance containing a plurality of frequency components, or the like, to control a motor in a constantly stable manner, it is suitable as a motor controller that drives apparatuses using a motor such as a component mounting apparatus and a semiconductor producing apparatus, and especially an apparatus where the mechanical resonance occurs.

REFERENCE MARKS IN THE DRAWINGS 10, 20, 90 Motor controller
11 Motor
12 Load
13 Speed detector
14, 94 Speed controlling section
15a, 15b, 15c, 95a, 95b, 95c Notch filter
16, 96 Torque controlling section
17a, 17b, 27a, 27b, 27c Oscillation extracting filter
18a, 18b, 18c Notch controlling section
19 Oscillation extracting filter controlling section
81 Notch filter for detection
82 Notch frequency changing section
97 Frequency estimating section
98 Notch filter selecting section
99 Notch frequency setting section

The invention claimed is:

1. A motor controller having a control system for feedback-controlling a moving operation of a motor moving section through use of a detected moving amount of the motor moving section, the motor controller comprising:
   a plurality of notch filters which are arranged inside the control system and attenuate signal components having near frequencies with a notch frequency at a center in an input signal;
   a plurality of oscillation extracting filters which are set with different frequency bands as being corresponded to the respective notch filters and extract oscillating components from the moving amount based upon the set frequency bands; and
   a plurality of notch controlling sections which are arranged with respect to the respective oscillation extracting filters and control the notch frequencies of the corresponding notch filters so as to decrease amplitudes of the oscillating components extracted by the oscillation extracting filter;
   wherein at least one of the oscillation extracting filters which allow passage of a signal inside said different frequency bands; and
   at least one of the oscillation extracting filters which blocks passage of said signal,
   the motor controller further comprising:
      an oscillating extracting filter controlling section which controls each of the oscillation extracting filters, wherein
      when one of the oscillation extracting filters extracts an oscillating component, the oscillation extracting filter controlling section changes the at least one of the oscillation extracting filters which blocks passage of said signal, to have a frequency characteristic of taking a pass frequency band of each of the oscillation extracting filters which allow passage of said signal inside the frequency bands as a stop frequency band, and allowing passage of a signal outside the stop frequency band.

2. The motor controller according to claim 1, wherein each of the notch controlling sections starts control of the notch frequency of the corresponding notch filter when the amplitude of the oscillating component extracted by the oscillation extracting filter exceeds a predetermined level.

3. The motor controller according to claim 2, wherein one oscillation extracting filter in the plurality of oscillation extracting filters takes a pass frequency band of each of the other oscillation extracting filters as a stop frequency band.

4. The motor controller according to claim 2, wherein two oscillation extracting filters are provided as the plurality of oscillation extracting filters, one oscillation extracting filter is a band pass filter that allows passage of a signal inside a predetermined frequency band, and the other oscillation extracting filter is a filter having such a frequency characteristic as to allow passage of a signal outside the frequency band of the one oscillation extracting filter.

5. The motor controller according to claim 1, wherein
   each of the notch controlling sections is capable of controlling the corresponding notch frequency, as well as switching between an enable state where a filter function is enabled and a disable state where the filter function is disabled, and
   when the corresponding notch filter is in the disable state and the amplitude of the oscillating component extracted by the oscillation extracting filter exceeds a predetermined level, each of the notch controlling sections brings the corresponding notch filter into the enable state and starts variable control of the notch frequency so as to decrease the amplitude of the oscillating component.

6. The motor controller according to claim 5, wherein one oscillation extracting filter in the plurality of oscillation extracting filters takes a pass frequency band of each of the other oscillation extracting filters as a stop frequency band.

7. The motor controller according to claim 5, wherein two oscillation extracting filters are provided as the plurality of oscillation extracting filters, one oscillation extracting filter is a band pass filter that allows passage of a signal inside a predetermined frequency band, and the other oscillation extracting filter is a filter having such a frequency characteristic as to allow passage of a signal outside the frequency band of the one oscillation extracting filter.

8. The motor controller according to claim 1, wherein
each of the notch controlling sections includes: a notch filter for detection which is equivalent to the corresponding notch filter; and
a notch frequency changing section which generates a notch frequency control signal for changing and controlling a notch frequency of the notch filter for detection, and
each of the notch controlling sections supplies the notch frequency control signal to the corresponding notch filter to control the notch frequency of the corresponding notch filter.

9. The motor controller according to claim 8, wherein one oscillation extracting filter in the plurality of oscillation extracting filters takes a pass frequency band of each of the other oscillation extracting filters as a stop frequency band.

10. The motor controller according to claim 8, wherein two oscillation extracting filters are provided as the plurality of oscillation extracting filters, one oscillation extracting filter is a band pass filter that allows passage of a signal inside a predetermined frequency band, and the other oscillation extracting filter is a filter having such a frequency characteristic as to allow passage of a signal outside the frequency band of the one oscillation extracting filter.

11. The motor controller according to claim 1, wherein one oscillation extracting filter in the plurality of oscillation extracting filters takes a pass frequency band of each of the other oscillation extracting filters as a stop frequency band.

12. The motor controller according to claim 1, wherein two oscillation extracting filters are provided as the plurality of oscillation extracting filters, one oscillation extracting filter is a band pass filter that allows passage of a signal inside a predetermined frequency band, and the other oscillation extracting filter is a filter having such a frequency characteristic as to allow passage of a signal outside the frequency band of the one oscillation extracting filter.

13. The motor controller according to claim 1, wherein each of the notch controlling sections controls the notch frequency of the corresponding notch filter so as to decrease the amplitude of the oscillating
component extracted by the corresponding oscillation extracting filter, as well as controlling a center frequency of the oscillation extracting filter so as to bring the center frequency of the corresponding oscillation extracting filter close to the notch frequency.

14. A motor controller having a control system for feedback-controlling a moving operation of a motor moving section through use of a detected moving amount of the motor moving section, the motor controller comprising:
a plurality of notch filters which are arranged inside the control system and attenuate signal components having near frequencies with a notch frequency at a center in an input signal;
a plurality of oscillation extracting filters which are set with different frequency bands as being corresponded to the respective notch filters and extract oscillating components from the moving amount based upon the set frequency bands; and
a plurality of notch controlling sections which are arranged with respect to the respective oscillation extracting filters and control the notch frequencies of the corresponding notch filters so as to decrease amplitudes of the oscillating components extracted by the oscillation extracting filter;
wherein at least one of the oscillation extracting filters which allows passage of a signal inside a frequency band of the different frequency bands;
at least one of the oscillation extracting filters which takes a pass frequency band of each of the oscillation extracting filters that allow passage of said signal inside the frequency bands as a stop frequency band, and allows passage of said signal outside the stop frequency band; and
at least one of the oscillation extracting filters which blocks passage of said signal,
the controller further comprising
an oscillation extracting filter controlling section which controls each of the oscillation extracting filters, wherein
when all of the oscillation extracting filters which allow passage of said signal inside the frequency bands and the oscillation extracting filter which allows passage of said signal outside the stop frequency band extract oscillating components,
the oscillation extracting filter controlling section changes the oscillation extracting filter which allows passage of said signal outside the stop frequency band, to have a frequency characteristic of allowing passage of said signal inside the frequency band including a frequency of the extracted oscillating component, as well as changing the oscillation extracting filter which blocks passage of said signal, to have frequency characteristic of taking a pass frequency band of each of the oscillation extracting filters which allow passage of said signal inside the frequency bands as a stop frequency band, and allowing passage of said signal outside the stop frequency band.

* * * * *